United States Patent [19]

Potier

[11] Patent Number: 5,428,600

[45] Date of Patent: Jun. 27, 1995

[54] METHOD AND DEVICES FOR TRANSMITTING DATA, PARTICULARLY BY SATELLITE

[75] Inventor: Thierry Potier, Maurepas, France

[73] Assignee: Dassault Electronique, Saint-Cloud, France

[21] Appl. No.: 183,076

[22] Filed: Jan. 18, 1994

[30] Foreign Application Priority Data

Jan. 20, 1993 [FR] France ................... 93 00540

[51] Int. Cl.$^6$ ........................................... H04B 7/185
[52] U.S. Cl. ........................................ 370/12; 370/75; 370/76; 370/122; 455/23; 455/45
[58] Field of Search ................ 370/12, 69.1, 75, 76, 370/122, 110.4; 455/12.1, 13.4, 17, 20, 23, 42, 45, 206; 380/12, 31, 32, 35

[56] References Cited

U.S. PATENT DOCUMENTS

| | | | |
|---|---|---|---|
| 2,654,885 | 10/1953 | Wilmotte | 455/206 |
| 3,180,938 | 4/1965 | Glomb | 370/75 |
| 3,546,386 | 12/1970 | Darcey | 455/23 |
| 5,081,703 | 1/1992 | Lee | 455/23 |

FOREIGN PATENT DOCUMENTS

3232599A1 3/1984 Germany.
3522132A1 12/1986 Germany.
WO8401679 4/1984 WIPO.

OTHER PUBLICATIONS

Global Positioning by Satellite; P. Mattos, Feb. 1989 Electronics & Wireless World, pp. 137–142.
VSAT Technology, Trends, and Applications; A. Rana; Proceedings of the IEEE, vol. 28, No. 7, Jul. 1990, pp. 1087–1095.
Implementation Imperfections of A 4∅-DCPSK On—Board Demodulator: Performance Degradations and Measurement Techniques; L. Moreno, Zie Voor Titel Boek; de 2e Pagina; pp. 469–476.

Primary Examiner—Benedict V. Safourek
Attorney, Agent, or Firm—Christie, Parker & Hale

[57] ABSTRACT

A relay satellite receives, from stations on the ground, modulated high-frequency signals situated in two different frequency bands. One of the modulations is narrow band and the other broad band. The satellite retransmits a multiplexed signal resulting from the phase modulation, of a sub-carrier consisting of the signal modulated by the narrow band modulation. The phase modulation is performed using signals drawn from the signals that carry the broad-band modulation. The user stations receive this multiplexed signal and extract therefrom, by filtering, the narrow band modulated sub-carrier, which can be used for phase-demodulating the multiplexed signal in order to recover signals which carry the broad-band modulation.

12 Claims, 4 Drawing Sheets

METHOD AND DEVICES FOR TRANSMITTING DATA, PARTICULARLY BY SATELLITE

BACKGROUND OF THE INVENTION

The invention concerns transmission techniques for the purpose of communication and possibly location.

It is known how to relay a two-directional link (FIG. 1) by satellite between different stations (A, B1, B2) on the Earth's surface or ground. The link from the main station A to the secondary stations Bi may be a high-power narrow-band link. In the opposite direction, from the secondary stations Bi to the head station A, it is preferable to use a broad-band link: subject to appropriate encoding, a broad-band link allows simultaneous communication from the secondary stations Bi to the main station A.

On board the satellite a repeater is installed, intended to provide appropriate transmission of the signals in the two bands. Conventionally, this repeater provides amplification separately for each of the bands in question.

Although able to function, this solution is not entirely satisfactory, for various reasons. One of these reasons is that the electrical power supply available on board a satellite is necessarily limited. However, though the narrow-band link may be subjected to high-gain (and therefore non-linear) amplification, on the other hand the same obviously cannot apply to the broad-band link. A compromise therefore has to be found between the amplification gain and the electrical power available.

Secondly, amplifying the signals of the two narrow-band and broad-band links respectively on board the satellite separately entails a duplication of certain functions; this is undesirable since the more complex the structure of the satellite the more tricky it is to set it up and maintain it.

SUMMARY OF THE INVENTION

The present invention aims to resolve these problems.

The invention, which may be defined in the form of a method and devices, starts from the observation that it is possible to carry out multiplexing which preserves the essential part of the data to be transmitted whilst allowing simplification of the structure of the repeater.

The method proposed is of the type in which a relay device or repeater receives modulated high-frequency signals in two different frequency bands in order to retransmit them to the main station and at least one secondary station.

According to the invention, the repeater retransmits a multiplexed signal resulting from a phase modulation. The "modulating" signals are drawn from those which carry the broad-band modulation. What is modulated is the narrow-band signal received (the sub-carrier). The user stations receive this multiplexed signal. They extract therefrom, by filtering, the narrow band modulated sub-carrier. Finally, particularly in the case of the main station A, this signal is used to phase-demodulate the multiplexed signal in order to recover the signals which carry the broad-band modulation.

This is well suited (but not exclusively) to the situation where the relay device is a terrestrial satellite, the links being radio links. As already indicated, the narrow band carries high-power signals between a main station on the ground and at least one secondary station on the ground, whilst the broad band carries signals of lower power between the secondary station or stations and the said main station.

A conventional satellite repeater comprises:
high-frequency reception amplifier means, associated with a first antenna, for receiving modulated high-frequency signals, situated on the one hand in a narrow frequency band and on the other hand in a broad frequency band,
means for processing the signals received, and
transmission-amplifying means associated with a second antenna for retransmitting processed signals, preserving the data from the said modulations.

According to the invention, the processing means of this repeater comprise filtering means for separating the narrow-band signals and broad-band signals, means for effecting a change of frequency chosen from the broad-band signals, and a device for phase-modulating the narrow-band signals by the broad-band signals after their change of frequency; the multiplexed signals resulting from the phase modulation are then applied to the transmission-amplifying means.

According to an interesting aspect of the invention, the transmission-amplifying means may then comprise a high-frequency non-linear high-gain power amplifier which processes the multiplexed signal overall without appreciably impairing the characteristics of the transmission.

The chosen frequency change mentioned above is perfectly adjusted to preserve a buffer frequency separation between the sub-carrier and its phase modulation.

The invention also proposes a receiver able to cooperate with such a repeater, of the type comprising high-frequency receiver means associated with an antenna for receiving the processed signals, preserving the data from the initial modulations, and processing means for recovering the data relating to the modulation in at least one of the two bands (depending on whether the receiver is installed on the main station or on the secondary stations).

According to the invention, the processing means of such a receiver comprise a filter for extracting the sub-carrier of the multiplexed signal received, and a device for demodulating, by means of this sub-carrier, the multiplexed signal received, which supplies signals carrying the data contained in the broad-band signal modulation. The narrow-band signal modulation, for its part, may be recovered on the sub-carrier.

Other characteristics and advantages of the invention will emerge from an examination of the following detailed description and the accompanying drawings.

DETAILED DESCRIPTION OF THE PREFERRED EMBODIMENT

Certain characteristics of the invention can be shown only by the drawings. Consequently the accompanying drawings, which are for the main part certain in nature, are to be considered to be incorporated in the present description. They may therefore not only serve to give a better understanding of the latter but also contribute to the definition of the invention where appropriate.

Figure 1:
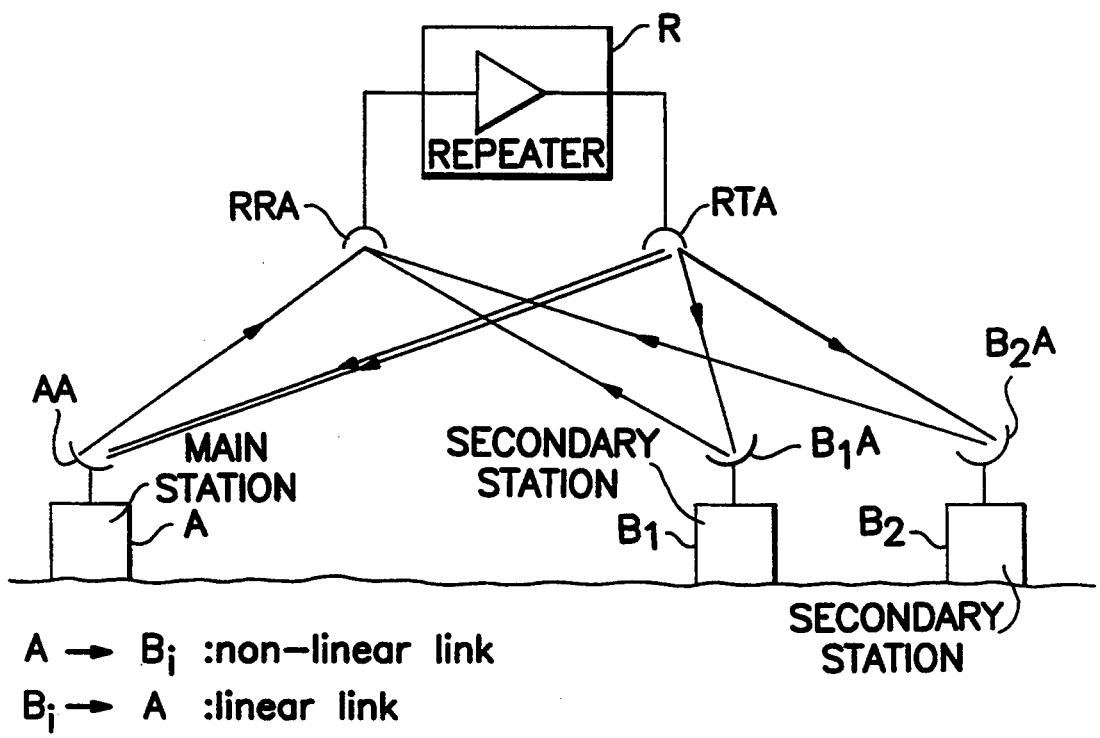
FIG. 1 is a diagram showing the communication between different ground stations and a repeater on a satellite.

In FIG. 1, a repeater R is installed on board a satellite. It has a reception antenna RRA and a transmission antenna RTA, both suitably oriented to scan a given area of the Earth's surface (or ground).

On the ground, a head station A has an antenna AA. In a known manner, the antenna AA is split, by means of a duplexer or circulator AD, between transmission functions AE and reception functions AR.

Figure 1A:
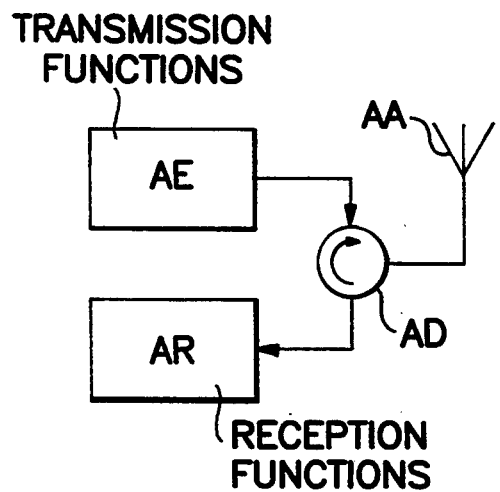
FIGS. 1A and 1B show the known separation between the transmission and reception functions of the ground stations.
Figure 1B:
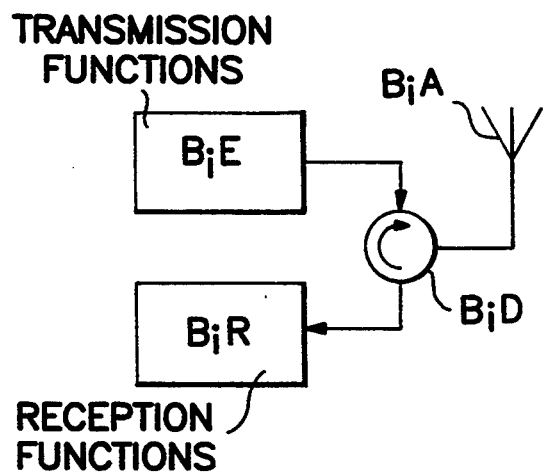

Secondary stations B1 and B2 (generically Bi) also have an antenna, with the same overall structure as with the head station, as illustrated in FIG. 1B.

The station A transmits a high-power narrow-band signal in the direction of the antenna RRA. This signal is transmitted through the repeater R to the antenna RTA, which returns the signal in question (optionally with a frequency shift) to the secondary stations Bi. In the opposite direction, the stations Bi, which are able to transmit simultaneously, send broad-band signals to the antenna RRA; the repeater retransmits these signals to the antenna RTA, which sends them to the antenna AA of the main station A.

Up till now, the solutions considered for designing the repeater R have simply consisted of amplification on two parallel channels, respectively for the narrow band and the broad band.

This has resulted in the problems already mentioned.

In particular, the narrow-band link may be subjected to a non-linear and therefore high-output amplification. On the other hand, because of the presence of several simultaneous signals, the other link must necessarily be subjected to a linear amplification, the output of which is much less; the amplification of the broad-band channel therefore makes heavy demands on the electrical power supply available on board the satellite, which creates a problem on which it is unnecessary to elaborate.

Finally, because of the limited space available on board satellites, it is difficult to avoid intermodulation of the two transmissions of the repeater, all the more so since a single antenna retransmits for the narrow and broad frequency bands concerned, which are often relatively close to each other.

In a particular application (FIG. 4A), the broad band BL lies between approximately 148 and 148.35 MHz, whilst the narrow band BE lies between 149.96 and 150.04 MHz. Fe designates the center frequency of the narrow band, which is of course modulated by the data coming from the station A. This narrow-band modulation may be of the so-called "BFSK" (Binary Frequency Shift Keying) type, standing for "frequency shift encoding".

The data going from the stations Bi to the station A are transmitted with spectrum stretching, which may be achieved in different ways. One of these consists of increasing the data flow by means of a special pseudo-random code and effecting a phase modulation on an appropriate carrier frequency. This is normally referred to as "CDMA" Code Division Multiple Access). The so-called "FDMA" (Frequency Division Multiple Access) can also be envisaged.

In any event, according to the known embodiments, the repeater of FIG. 1 has two separate channels for amplifying and retransmitting on the one hand the signal belonging to the narrow-frequency band and on the other hand the signals belonging to the broad band.

Figure 2:
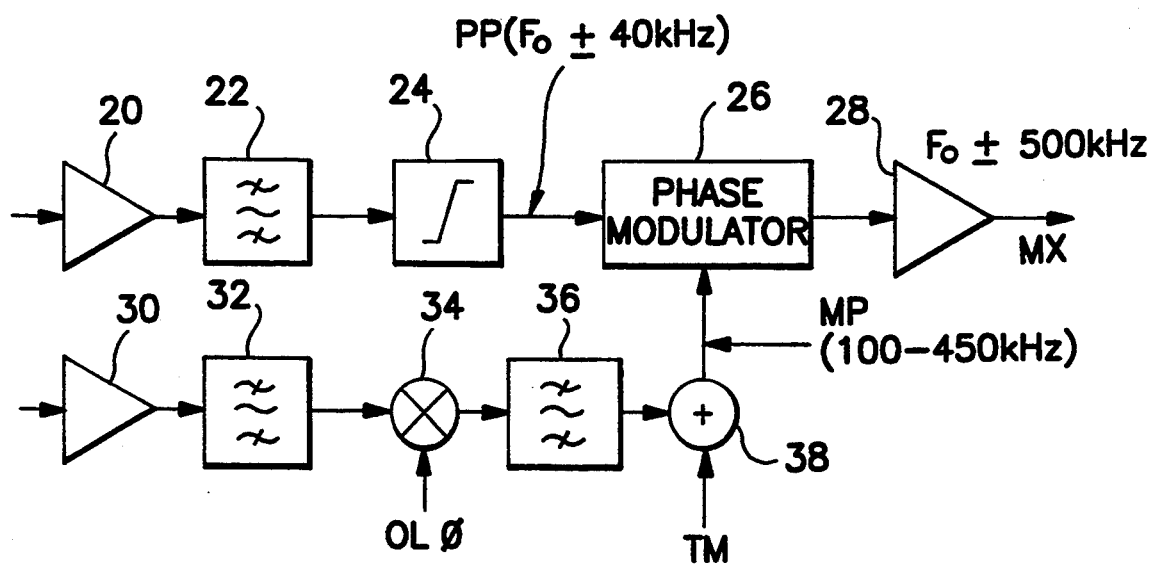
FIG. 2 is a skeleton diagram (the frequencies being for guidance only) of the processing according to the invention at the repeater, whilst
Figure 2A:
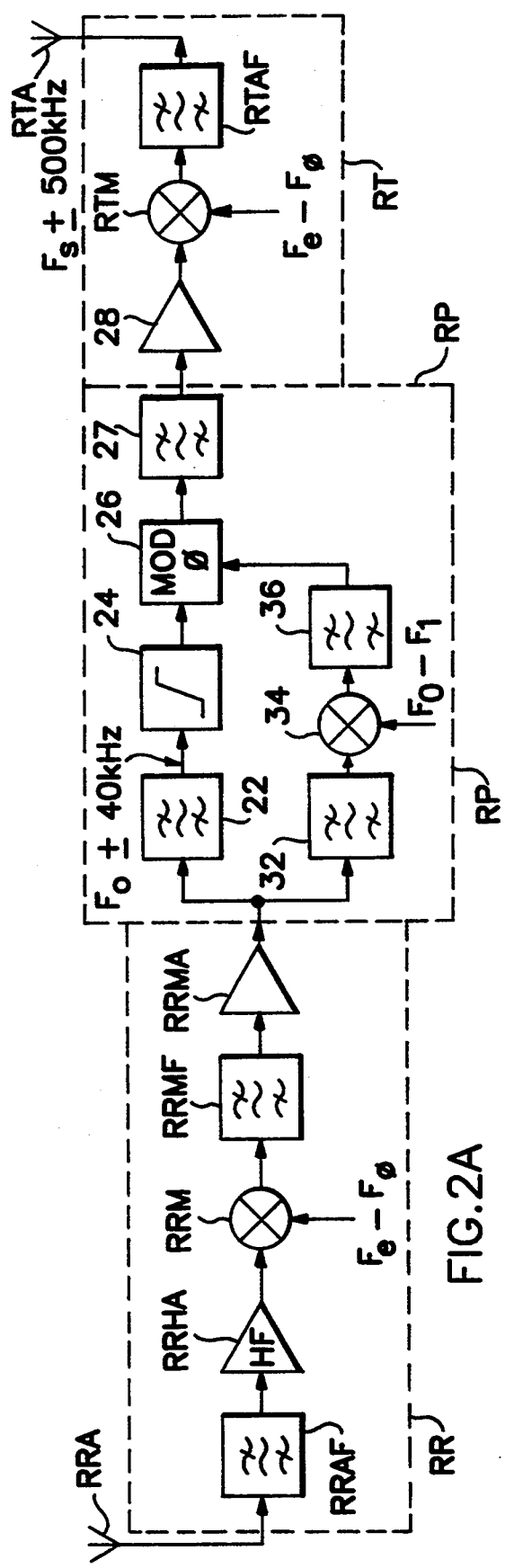
FIG. 2A is a detailed diagram of an example of a repeater structure.

The repeater according to the invention will now be described with reference to FIG. 2 for the principles of the invention and FIG. 2A for a detailed example embodiment.

The antenna RRA is connected to a high-frequency reception amplifier RR, which may be of a known type. After an antenna filter RRAF and an amplifier RRHA in the reception band, a mixer RRM with a local signal of frequency Fe-F0 is provided. A filter RRMF selects the lower beat frequency and applies it to a medium-frequency amplifier RRMA.

The narrow band and broad band are then respectively separated by the filters 22 and 32, which mark the start of the processing circuits RP of the repeater according to the invention. They may be preceded by respective amplifiers 20 and 30 (FIG. 2).

Figure 4A:
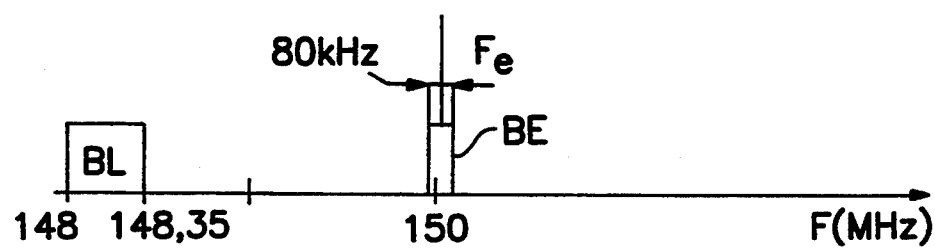
FIGS. 4A to 4C are frequency diagrams useful for an understanding of the invention.

The output of the filter 22 is for example equal to the frequency F0±40 kHz (the center frequency Fe of the narrow band BE of FIG. 4A becomes F0 after the change of frequency effected in RRM). After this filter 22 a level-adjustment device 24 is provided, which may be an automatic gain control stage, or more simply a limiter.

At the bottom, the output of the filter 32 is applied to a mixer 34 which receives a frequency F0-F1, and is followed by a lower beat frequency filter 36.

The output of the limiter 24 constitutes the first input (the signal to be modulated) of a phase modulator 26. The output of the filter 36 is applied as a modulating signal to the phase modulator 26. This is followed by a filter 27.

In practice, it is at one and/or the other of the filters 32 and 36 that the functions of filtering the undesirable signals and automatic gain control, which it is sometimes necessary to incorporate in such a repeater, will be carried out. In addition, the telemetry signals TM may be added at an adder 38 located after the filter 36 (FIG. 2).

The frequency F1 used for the mixer 34 is determined so that the frequency band at the output of the filter 36 (and optionally of the adder 38) extends for example from 100 to 450 kHz, in order to drive the phase modulator 26 appropriately.

Figure 4B:
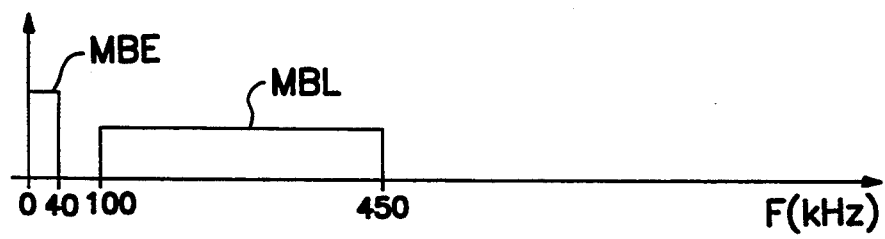

As is shown in FIG. 4B, the frequency changes RRM and 34 have the effect of bringing the broad band MBL fairly close to zero frequency. Purely for information, the bandwidth of the modulation MBE (relative to the frequency Fe at the electromagnetic wave level and to F0 at the input of the phase modulator 26) has also been shown in FIG. 4B.

Figure 4C:
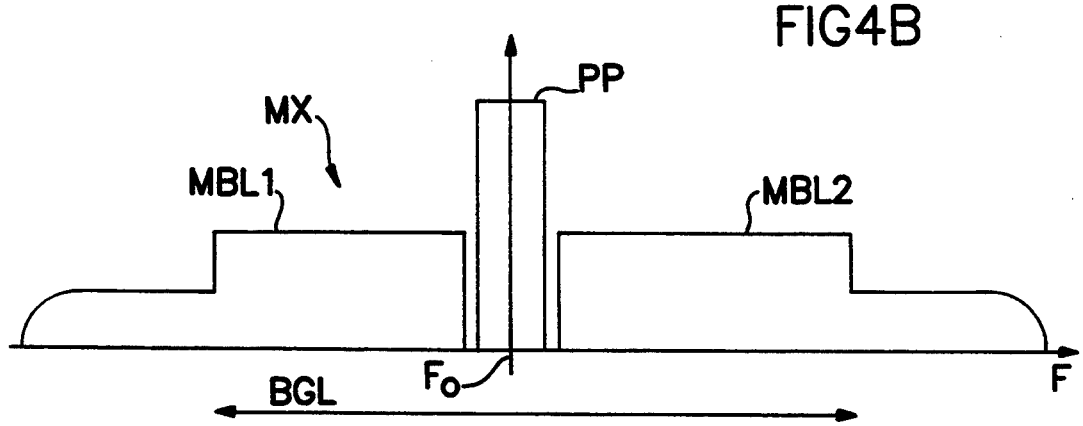

The spectral curve of the output of the phase modulator 26 is illustrated in FIG. 4C. Around the frequency F0, the modulation MBE of FIG. 4B creates a sub-carrier PP, the modulation conditions of which are the ones chosen for the narrow-band transmission of the station A.

It is important to note that it is not the frequency F0 but the entire sub-carrier, that is to say this frequency F0 and its modulation of the MBE type which is in its turn phase-modulated by the modulation MBL of FIG. 4B.

Two lateral bands MBL1 and MBL2 result from this, the overall curves for which are given in FIG. 4C.

Overall, the main part of the transmission spectrum may be confined to an overall band BGL of approximately 1 MHz.

Modulation residues exist on each side, at a much lower level.

The case where the frequency bands are those indicated above is taken as an example.

It has proved possible to preserve a satisfactory power ratio between the narrow-band signals and the broad-band signals, by choosing a modulation factor for the phase modulation 26 of approximately 0.4 radians (RMS).

From there, and in spite of the existence of a broad band to be transmitted, it becomes possible to use the output of the phase modulator 26 to feed (FIG. 2) an amplifier 28 of the non-linear, very high gain type, for example an amplifier operating in Class B, which delivers a power of around 40 watts.

In a detailed embodiment (FIG. 2A), the amplifier 28 forms part of transmission-amplifying means RT of the repeater, which comprise a reverse transposition mixer RTM from the local signal FS-FO, and then a mixing filter 27, which feeds the amplifier 28, and finally the filter RTAF which feeds the antenna RTA.

Highly advantageously, the lower limit of the band MBL in FIG. 4B is located so that a frequency separation of adequate size remains between this band and that which relates to the sub-carrier PP.

Although this buffer separation is to be defined according to the application, the Applicant currently considers that, under the detailed conditions provided for here, the frequency separation should be 60 kHz.

Figure 3:
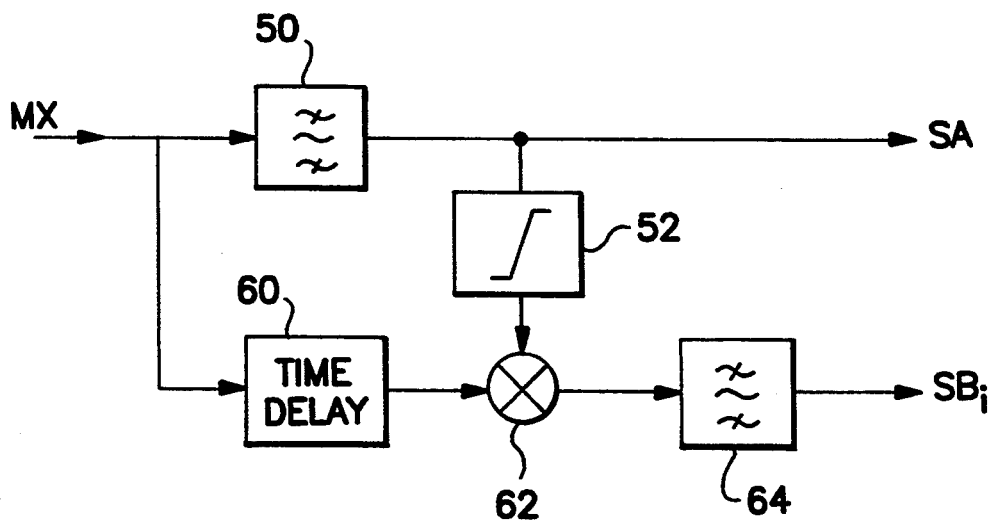
FIG. 3 is a skeleton diagram of the processing carried out on board a ground receiver, whilst
Figure 3A:
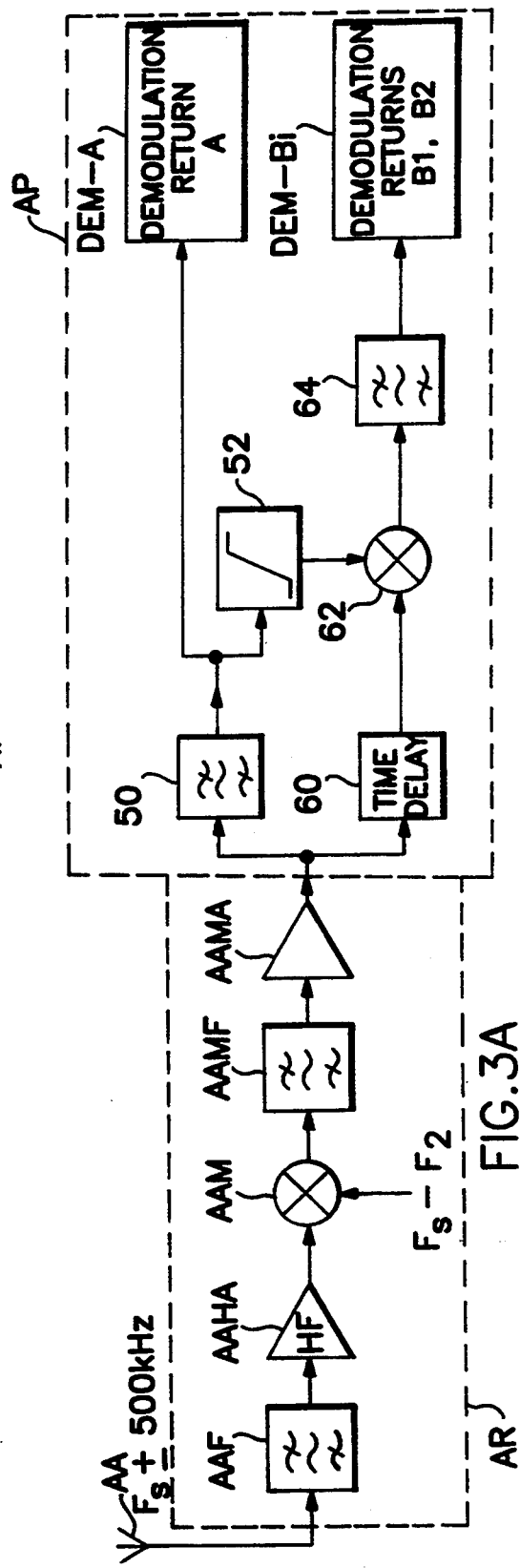
FIG. 3A is a detailed diagram of such a receiver.

Reference is now made to FIG. 3 for the skeleton diagram of a ground station, and to FIG. 3A for a detailed diagram thereof.

It should first of all be borne in mind that this is the main station A.

The antenna AA is connected to a high-frequency receiver AR, which includes an antenna filter AAF, a high-frequency amplifier AAHA, a device for mixing AAM by means of a local signal FS-F2, a lower beat frequency filter AAMF (F2±500 kHz), and a medium-frequency amplifier AAMA.

The output of the amplifier AAMA is connected to processing means AP, where a first channel is defined by a filter 50 which isolates the sub-carrier PP, whilst a second channel begins with a time-delay circuit 60, capable of applying to the signals a pure time delay substantially equal to the transit time of the signals in the filter 50.

The output of the filter 50 supplies the sub-carrier, which may be applied to demodulation circuits DEM_A used in a conventional manner to demodulate the signal in question, having regard to its carrier.

The output of the filter 50 is also applied to a level-adjustment circuit 52, preferably consisting of a limiter stage.

A phase comparator 62 receives on the one hand the output from the time-delay circuit 60 and on the other hand the output from the limiter 52. After passing through the filter 64, the broad band is obtained, the spectral occupation of which is shown in FIG. 4B. This broad band too can be applied to demodulation circuits DEM_Bi, the task of which is to recover the returns 5coming from the stations such as B1 and B2 (FIG. 1).

The principle of the two-directional links to which the present application may be applied will now be dealt with once more.

Since it is the main or head station, the task of the station A is on the one hand to transmit its own signals (as well as remote-control signals for the satellite repeater), and on the other hand not only to receive the responses from the stations Bi, which will take place until the step of the stage DEM_Bi, but also to listen to its own signals, as retransmitted by the repeater, which will take place at the stage DEM_A.

For the stations Bi, it is not necessary for them to listen to their own signals, or those of the sister stations. Consequently it is possible, for some applications at least, in designing the reception stages of the stations Bi, to omit the components 52, 60, 62, 64 and DEM_Bi of FIG. 3A.

Moreover, a person skilled in the art will understand that this FIG. 3A describes only the reception part AR or BiR of FIGS. 1A and 1B. The transmission parts AE and Bile remain of the conventional type.

The present invention makes it possible therefore to effect a two-directional communication link which is completely controlled by the station A, and by means of the repeater on the satellite R. This communication link may function as a network.

By allowing in particular the use of a non-linear, very high gain amplifier, the invention affords considerable improvement with regard to the construction of the satellite and the design of its power supply, for example through solar panels. In addition, it has been observed that the phase modulation as described preserves the required linearity in the broad band in an entirely satisfactory manner.

And, as already indicated, the satellite repeater is simple, which is advantageous with regard to its design and maintenance.

The problems posed because of the inter-modulation of the two transmitters on the two channels to be repeated, with the means of the prior art, are also practically eliminated.

The present invention can be applied in a more general manner than for the two-directional message carrying which has just been defined.

In particular, as is known to a person skilled in the art, it can also be used for location, through the use of the Doppler effect related to the movement of the satellite, since the latter is more rapid than the movement of the stations on the ground.

For implementing the invention, it may be advantageous for the antennae RRA and RTA of the satellite to have fairly open radiation diagrams. It is also important for these antennae to be optimized by means of what is known as the use of "shaped" lobes on the sides. This consists of adjusting the lateral parts of the antenna lobes in order to compensate for the fact that radiation received laterally on the antenna comes in general from a station which is a little more distant than one received in the axis of the antenna.

In the above, the modulation according to the invention was defined as phase modulation. Naturally, it may also be considered to be frequency modulation or more generally angular modulation, as is known to a person skilled in the art.

The narrow and broad bands, for their part, may be two parts, adjacent or otherwise, of the VHF, UHF or other spectrum.

I claim:

1. A method for transmitting data, comprising the steps of:
   a) transmitting a first high frequency signal situated in a first frequency band, said first high frequency signal being subjected to broad-band modulation by first data,
   b) transmitting a second high frequency signal situated in a second frequency band, said second high frequency signal being subjected to narrow-band modulation by second data,
   c) receiving said first and second high frequency signals,
   d) retransmitting said signals, and
   e) selectively receiving at least said second high frequency signal of said re-transmitted signals, at user stations,
   wherein:
   step d) comprises:
   d1) mixing said received first high frequency signal with at least one local signal,
   d2) phase modulating said mixed first high frequency signal onto said received second high frequency signal, and
   d3) re-transmitting a multiplexed signal resulting from said phase modulation, and
   step e) comprises:
   e1) receiving said multiplexed signal at the user stations, and
   e2) filtering said narrow-band modulated second signal out of said multiplexed signal.

2. The method of claim 1, wherein, in at least one of the user stations, the narrow-bond modulated second signal is used to phase-demodulate the multiplexed signal in order to recover signals carrying the broad-band modulation.

3. The method of claim 1, wherein the relay device is a terrestrial satellite which retransmits the multiplexed signal.

4. The method of claim 1, wherein the narrow band carries high-power signals between a main station on the ground and at least one secondary station on the ground, whilst the broad band carries signals of lower power between the secondary station or stations and the main station.

5. The method of claim 1, wherein the narrow band and broad band are two adjacent parts of a frequency spectrum selected from the VHF and UHF spectra.

6. The method of claim 1, wherein the second signal is extracted from the multiplexed signal received, with a change of frequency of the multiplexed signal received.

7. An electromagnetic repeater comprising:
   high-frequency reception amplifier means, associated with a first antenna, for receiving first and second data comprised respectively in first and second modulated high-frequency signals, the first data being contained in a narrow-frequency band and the second data being contained in a broad frequency band,
   means for processing said first and second signals received, and
   transmission-amplifying means associated with a second antenna for retransmitting processed signals, preserving the data from said modulations, wherein the processing means comprise filtering means for separating said second narrow-band signal from said first broad-band signal, means for effecting a predetermined change of frequency of said first broad-band signal, and a device for phase-modulating said second narrow-band signal by said first broad-band signal after said predetermined change of frequency of said first broad-band signal for delivering a multiplexed signal to said transmission amplifying means.

8. The device of claim 7, wherein said transmission amplifying means comprises a high-frequency non-linear high-gain power amplifier.

9. The device of claim 7, wherein said device for phase-modulating comprises a stage for adjusting the level of said second narrow-band signal after its separation, from said first broad-band signal, by said filtering means.

10. The device of claim 7, wherein said means for effecting a predetermined change of frequency comprises means for adjusting said change of frequency of said first broad-band signal to preserve a buffer frequency separation between said first narrow-band signal and its phase modulation.

11. A receiver for cooperating with a repeater for outputting a multiplexed signal comprising a high frequency signal modulated by a narrow band signal and modulated by a broad band signal having first and second data, respectively, the receiver comprising:
   high-frequency reception means associated with an antenna for receiving said multiplexed signal processed by a transmission amplifier, and preserving said first and second data, and processing means for recovering data relating to the modulation in at least one of the two bands, wherein said processing means comprises a filter for extracting said narrow-band signal of the multiplexed signal received, and a device for demodulating, by means of said extracted narrow-band signal, the multiplexed signal received, which supplies said broad-band signal.

12. The receiver of claim 11, wherein said device for demodulating comprises a stage for adjusting the level of said narrow-band signal, and a phase comparator.

* * * * *